United States Patent [19]
Smith et al.

[11] 3,935,945
[45] Feb. 3, 1976

[54] OPEN SIDED PARTIALLY CIRCULAR HEADED NAIL WITH RECESS ALONG THE OPEN-SIDED EDGE THEREOF AND STICK PACKAGE FORMED THEREFROM

[75] Inventors: George M. Smith, Pawcatuck, Conn.; Joseph Silva, Cranston, R.I.

[73] Assignee: Textron, Inc., Providence, R.I.

[22] Filed: Apr. 9, 1975

[21] Appl. No.: 566,432

[52] U.S. Cl. .................................. 206/343; 85/28
[51] Int. Cl.² .................................. B65D 73/02
[58] Field of Search ............... 85/28, 29, 17, 18; 206/343, 344

[56] References Cited
UNITED STATES PATENTS

| | | | |
|---|---|---|---|
| 2,940,081 | 6/1960 | Juilfs | 85/28 |
| 3,152,334 | 10/1964 | Lingle | 85/28 |
| 3,481,459 | 12/1969 | Becht | 85/28 |
| 3,835,991 | 9/1974 | Brecht | 206/343 |
| 3,861,526 | 1/1975 | Leistner | 206/343 |

*Primary Examiner*—Marion Parsons, Jr.
*Attorney, Agent, or Firm*—Cushman, Darby & Cushman

[57] ABSTRACT

A nail constructed with conventional heading equipment with an open-sided partially circular head having a recess along the open-sided edge thereof to permit burr growth without interfering with the interengagement of a downwardly facing abutment surface of the head with a mating top surface abutment area when a plurality of such nails is collated and secured in an angle stick package with the shanks and heads of adjacent nails in abutting relation.

5 Claims, 4 Drawing Figures

U.S. Patent  February 3, 1976  3,935,945
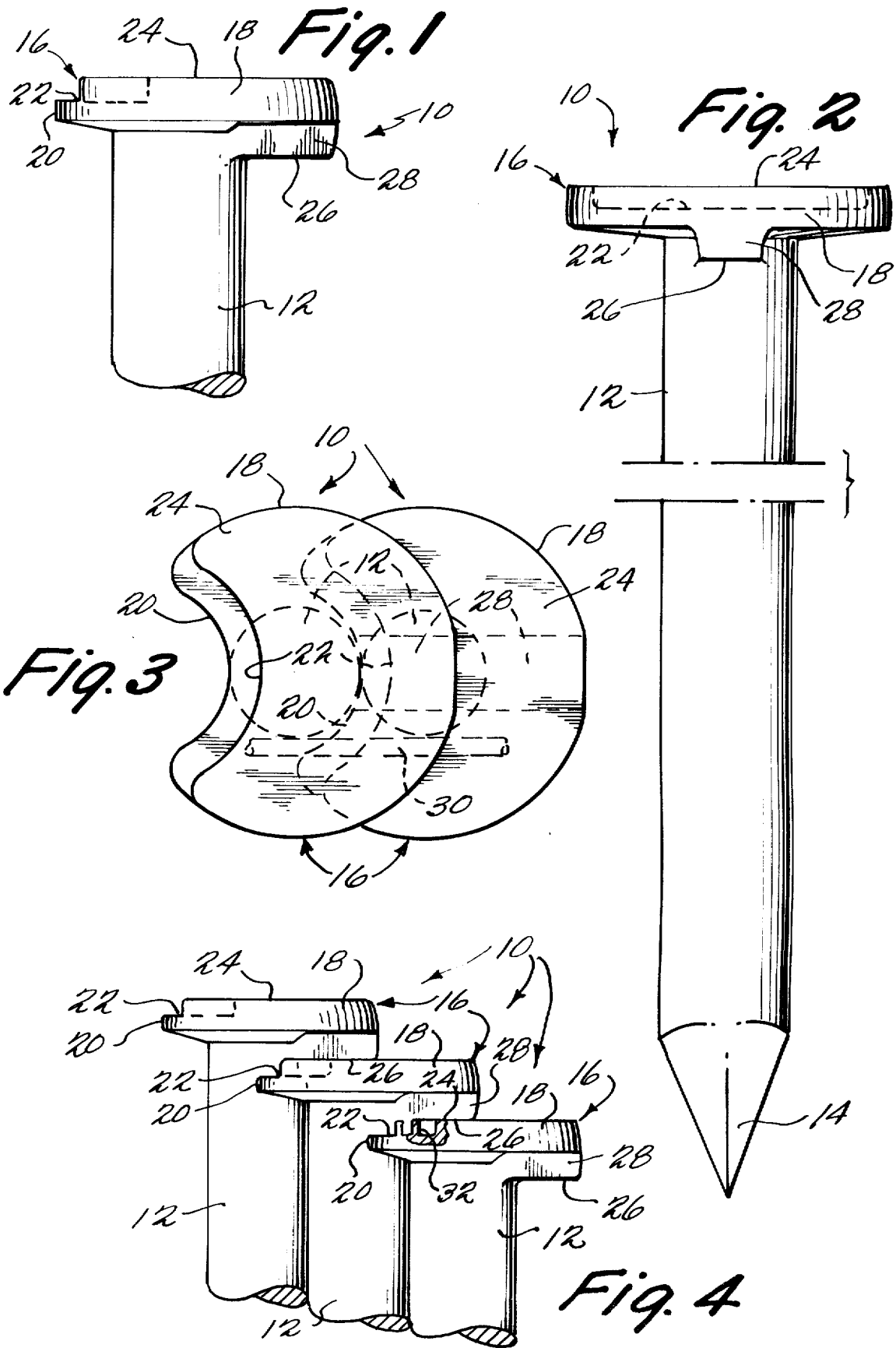

OPEN SIDED PARTIALLY CIRCULAR HEADED NAIL WITH RECESS ALONG THE OPEN-SIDED EDGE THEREOF AND STICK PACKAGE FORMED THEREFROM

This invention relates to nails and more particularly to nails of the type individually manufactured on conventional mass production swaging or heading machines and subsequently collated and secured into abutting stick formation packages suitable for loading into and individual nail driving from a power actuated driving device.

Within the last two decades portable power operated fastener driving devices have come into widespread use, particularly pneumatically actuated devices of this type.

An inherent advantage of these devices which has been a significant factor in their acceptance is that they are capable of receiving a supply of fasteners in conveniently packaged form and to handle the same in a manner permitting successive individual fasteners to be driven in response to a simple manual actuating procedure such as pulling a trigger. The simplest fastener package and the one initially utilized consisted of a stick of staples quite similar to those utilized in conventional desk staplers. Fasteners such as staples and T-nails, because they are essentially constructed of uniform thickness, are easy to assemble in an abutting row formation, as by simple guides; easy to secure in such formation, as by an adhesive; easy to individually feed, as by a simple resilient bias of the stick in a direction to move a leading fastener into a drive track; and easy to drive, as by simply stripping the leading fastener from the stick by a driver.

Fasteners which varied in thickness, such as headed nails, required much more sophisticated package formation assembly, package securement and feeding and driving procedures. In general, it can be stated that stick packaging of full round head nails has not achieved any significant acceptance because of the excess spacing required between the shanks due to the existence of the lateral extension of the head throughout the entire peripheral extent of the shank. This spacing unfavorably affected the nail density of the packages, and presented severe securement difficulties. Consequently, coil formation packages of full round headed nails have achieved more widespread acceptance.

In recent years semi-circular head type nails, such as the so-called D-head nail or notched head nail have achieved increased acceptance as a desirable compromise in the known advantages and disadvantages between T-nails and full round head nails. In general, it can be stated that these nails achieve a measure of the head holding advantages which full headed nails have over T-nails and a measure of the packaging advantages which T-nails have over full headed nails. However, in achieving this balance of advantageous capabilities, there are also presented difficulties of a different nature resulting from the inherent non-symmetrical form of the head. These peculiar difficulties are encountered in the making of the nail, the assembly or collating of the nails after manufacture, the securement of the nails in stick formation after collation, the loading and feeding of the package in the device and the driving of individual nails from the package. Experience has shown that perhaps the most severe difficulty presented is the fact that all of these separately identifiable difficulties are inherently interrelated. All too often a proposed solution of one individual problem has resulted in aggravating another individual difficulty to the point of rendering the proposed solution unworkable.

For example, in U.S. Pat. Nos. 3,481,459 and 3,861,526 there are disclosed nails of this type in which the semi-round or open-sided head is generally formed of relatively small thickness measured in the direction of the shank axis. In conjunction with this generally thin head construction, there is provided on the underside of the head a depending integral formation which has a downwardly facing surface parallel with top surface of the head. In the earlier patent this formation assumed an interrupted collar configuration, while in the later patent the formation assumed an elongated ridge configuration extending along an axis bisecting the semi-round head. As indicated in these patents, the formations were provided for the purpose of enabling the heads of adjacent nails to abut one another, a functional attribute which materially assisted the collating procedures and enhanced the securement characteristics of the stick formation package. However, both of these patents are silent as to certain problems that arise when these configurations are actually manufactured on conventional nail heading equipment, which problem has serious deleterious effects on the very advantages attributable to the provision of the formations. This problem arises as a result of the parting line between the swaging tools of the heading equipment which occurs along the upper edge of the head defining the open side thereof. In actual practice the existence of the parting line results in the development of a slight burr at this edge which progressively grows in height as the swaging tools are worn by progressive use. The height of this burr at the point of the intersection of the edge with the shank can grow within the short time of one continuous production shift to an extent sufficient to completely distort the proper functioning of the depending formation of the head.

It will be understood that in both the interrupted collar configuration and the elongated ridge configuration the abutting contact area of the downwardly facing surface thereof with the top surface of the abutting head when in package row formation is a small area which extends inwardly from the central portion of the open-sided edge. Consequently, the aforesaid burr grows upwardly from the top surface of the head precisely within this area of contact. The result is that as production progressively advances the top of the burr becomes the contact point and the upward extent of the row formation gradually increases from the original desired angle to one which cannot be accommodated in the magazine of the device.

The economics of manufacture dictate a tool life which is at least one shift preferably considerably longer. The economics of manufacture further prohibit the cost of removing the burr before collation.

In U.S. Pat. No. 3,835,991 there is disclosed another configuration of depending formation in such a head which will accommodate the aforesaid burr growth. The depending formation in this patent is an abutment configuration spaced from the shank. While the aforementioned burr problem is not specifically mentioned in the patent, the spaced location of the abutment provides a contact area on the top surface of the adjacent nail head which is spaced from the area of burr growth thus permitting a satisfactory tool life. Whether or not the spaced position of the abutment of the patent was chosen to obviate the burr problem, the spaced position introduces other problems which make continuous production problematical. Specifically, since the material which forms the head comes from an end portion of shank stock, it becomes necessary in order to form the abutment to effectively change the direction of cold flow of the metal during the swaging action from radial to axial. This change is difficult to consistently achieve. Moreover, trapped air can present variations.

Even if these manufacturing difficulties can be overcome the finished nail will still present a head having a burr sticking up from the flat top surface thereof which is undesirable during the driving action due to the necessity to cam the nail head laterally with respect to the driver and after nailing where the burr may protrude above the workpiece.

Accordingly it is an object of the present invention to provide a nail head construction of the type described which overcomes the burr problem without the deleterious effects aforesaid. In accordance with the principles of the present invention this objective is obtained by forming a recess along the top surface of the open side of the head which extends inwardly from the top edge thereof. Such a recess can be provided by forming a corresponding projection in the swaging plunger tool which is so located as not to require a change in the direction of material flow during the swaging action. The recess thus formed permits burr growth which will not interfere with depending formations of the collar or ridge type which can be reliably formed without abrupt change in direction of the material flow. The resultant head, even as the burr is allowed to grow to secure sufficient tool life, still presents flat top surface without any metal projecting thereabove since all of the burr growth takes place within the recess. In the preferred embodiment trapping air during the formation of the recess is precluded by extending the recess beyond the central portion of the open sided edge in both directions to the adjacent periphery.

Another object of the present invention is the provision of a nail construction and stick package thereof which is simple in construction, economical to manufacture and effective in operation.

These and other objects of the present invention will become more apparent during the course of the following detailed description and appended claims.

The invention can best be understood with reference to the accompanying drawings wherein an illustrative embodiment is shown.

In the drawings:

FIG. 1 is a fragmentary side elevational view of a nail showing the improved head construction of the present invention;

FIG. 2 is an elevational view, partly broken away, of the nail shown in FIG. 1 looking toward the full side thereof;

FIG. 3 is a fragmentary top plan view of a nail stick package embodying the principles of the present invention, showing two abutting nails of the package; and FIG. 4 is a view similar to FIG. 1 of the nail stick package of FIG. 3 showing the upper head portions of three abutting nails of the package, with certain parts broken away to illustrate how the effects of burr growth are obviated by the recess configuration.

Referring now more particularly to the drawings, there is shown therein a nail, generally indicated at 10, which embodies the principles of the present invention. The nail 10 includes the usual shank 12, having a workpiece entering point construction 14 (see FIG. 2) formed on one end thereof and a head construction 16 formed on the other end thereof which embodies the improvements of the present invention.

It will be understood that the shank 12 may assume any desired conventional construction, the configuration shown in the drawings being cylindrical with a smooth periphery. Other cross-sectional configurations may be employed, as, for example, the square cross-section disclosed in U.S. Pat. No. 3,861,526 (FIG. 10) or the cylindrical configuration modified with flats disclosed in U.S. Pat. No. 3,481,459. Likewise, the periphery of the shank may assume known configurations other than the exemplary smooth configuration shown, such as a ringed configuration, a spiral fluted configuration or the like. The point construction 14 may likewise assume any known configuration as, for example, a diamond point configuration, a chisel point configuration, etc.

In accordance with the principles of the present invention, the head construction is basically of the semi-round or open-sided configuration. The preferred specific configuration shown is of the notched type, although it will be understood that the present invention likewise contemplates a D-configuration such as shown in U.S. Pat. No. 3,861,526 (FIG. 10) as well. The preferred notched head configuration provides a generally partially circular peripheral edge 18 interconnected by an open-sided peripheral edge 20 which is concavely arcuate and extends inwardly in aligned tangential relation to an adjacent side of the shank. Formed in the upper portion of the head 16 is a recess 22 which extends along at least the central portion of the open-sided edge 20 in overlying relation to the portion of the shank 12 defining the aforesaid adjacent side thereof and preferably, as shown, throughout the entire extent of the edge 20.

As previously indicated, the recess is formed by providing a correspondingly shaped projection in the plunger swaging tool of the heading equipment and provides a space within which the aforesaid burr is allowed to grow. The recess 22 is preferably relatively shallow in depth and relatively thin in width, an exemplary dimension for a nail having a shank diameter of 0.105 inch being 0.020 inch deep and 0.030 inch wide.

The upper portion of the head 16 bounded by the inner edge of the recess 22 and the partially circular peripheral edge 18 has a planar top surface 24 which includes an abutment surface area extending inwardly from the central portion of the recess 22 to mate with an abutment surface 26 formed on the lower portion of the head 16 bounded by the partially circular peripheral edge 18 and extending radially outwardly of the shank 12. The abutment surface 26 may extend radially outwardly throughout the entire aforesaid lower portion of the head, however, it is preferable in order to save material and insure adequate material flow radially outwardly to the desired peripheral extent to provide the abutment surface 26 on a relatively small formation 28 extending downwardly in depending relation to the remainder of the radially outwardly extending portion of the head. This formation, as shown, is in the ridge configuration such as illustrated in the aforesaid U.S. Pat. No. 3,861,526, the disclosure of which relating to the ridge configuration is hereby incorporated by reference into the present specification. It will be understood that other configurations may likewise be utilized.

FIGS. 3 and 4 illustrate the collation and securement of a plurality of nails 10 in an angled stick package. By providing an open-sided edge 20, an abutment surface 26 and a mating surface area in the top surface 24 of each nail 10 it becomes possible to collate a plurality of nails in a row formation with the shanks and heads of adjacent nails in abutting relation. This relationship enables the collating equipment to be run at maximum speeds since the interengagement of the mating abutment surfaces 24 and 26 of the nails themselves automatically determines the proper angle to the row formation. Once collated the nails can be secured in the row formation in any conventional fashion. A preferred means for effecting securement is to weld a pair of parallel wires 30 to one side of the shanks in accordance with the teachings of U.S. Pat. No. 3,083,369 with the wire extending parallel with the angular extent of the row formation.

With reference to the broken-away portion of the right hand nail 10 shown in FIG. 4, it will be noted that when a burr 32 has grown to a considerable height within the recess 22 its upper surface does not reach the level of the top surface 24 which defines the mating abutment surface area engaged by the abutment surface 26 of the adjacent nail. The recess 22 thus permits burr growth and the extended tool life attendant thereto without disrupting the abutting relationship of the surfaces provided to determine the proper angular relationship.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A nail including a shank provided by a length of metal strand material severed at one end from an end portion of a supply of such material and formed thereon with a workpiece entering configuration, said shank having an integral enlargement on the opposite end portion thereof formed by surrounding the end portion with die means and impacting a mating plunger means longitudinally on the end surface thereof to cause the impacted material to cold flow in the die means, said enlargement defining a head configured to facilitate collation of said nail with similar nails in a row formation in which the shanks of adjacent nails are in abutting parallel relation and the heads of adjacent nails are in overlapping abutting relation, said head extending radially outwardly from said shank substantially throughout the entire periphery thereof and terminating in a partially circular peripheral edge of greater than 180° generally arcuate about the axis of said shank interconnected by an open-sided peripheral edge disposed in aligned relation at its central portion with an adjacent side of said shank, the upper portion of said head having a recess therein which extends inwardly along at least the central portion of said open-sided edge in overlying relation to the portion of the shank defining said adjacent side thereof, the lower portion of said head bounded by said partially circular peripheral edge and extending radially outwardly from said shank defining a downwardly facing abutment surface extending outwardly from the adjacent periphery of said shank toward said partially circular peripheral edge, the upper portion of said head having a top surface including a mating upwardly facing abutment surface area extending inwardly of said recess, the radially outward extent of said downwardly facing abutment surface being greater than the radially inward extent of said recess.

2. A nail as defined in claim 1 wherein said recess extends inwardly along the entire open-sided peripheral edge.

3. A nail as defined in claim 2 wherein said open-sided peripheral edge is concavely curved.

4. A nail as defined in claim 3 wherein said downwardly facing surface is defined by a portion of said head which extends downwardly in depending relation with respect to the remaining radially outwardly extending portion of said head.

5. A nail as defined in claim 1 in combination with a plurality of similarly constructed nails disposed in an angularly extending row formation with adjacent nails of the row having their shanks in abutting parallel relation and the mating surface areas of the heads thereof in abutting relation, and means for securing said nails in said row formation.

* * * * *